United States Patent

Meier-Burkamp

[11] Patent Number: 5,143,189
[45] Date of Patent: Sep. 1, 1992

[54] PAWL-RATCHET FREE-WHEEL MECHANISM FOR A BICYCLE HUB

[75] Inventor: Gerhard Meier-Burkamp, Bergrheinfeld, Fed. Rep. of Germany

[73] Assignee: Fichtel & Sachs AG, Schweinfurt, Fed. Rep. of Germany

[21] Appl. No.: 743,999

[22] Filed: Aug. 12, 1991

[30] Foreign Application Priority Data

Aug. 14, 1990 [DE] Fed. Rep. of Germany ....... 4025708

[51] Int. Cl.⁵ .............................................. F16D 41/30
[52] U.S. Cl. .......................................... 192/64; 192/46
[58] Field of Search ..................... 192/64, 46, 43.2; 74/577 E; 301/105 B

[56] References Cited

U.S. PATENT DOCUMENTS

| | | | |
|---|---|---|---|
| 2,587,864 | 3/1952 | Lefere | 29/129.3 |
| 2,997,145 | 8/1961 | Ross | 192/6 R |
| 3,166,171 | 1/1965 | Schwerdhöfer et al. | 192/64 |
| 3,874,055 | 4/1975 | Wilcox | 29/159.01 |
| 4,183,262 | 1/1980 | Segawa | 192/64 X |
| 4,363,390 | 12/1982 | Eisend et al. | 192/46 |
| 4,400,999 | 8/1983 | Steuer | 475/213 |
| 4,913,500 | 4/1990 | Wauke et al. | 192/105 B |

FOREIGN PATENT DOCUMENTS

| | | | |
|---|---|---|---|
| 1918 | 11/1898 | Denmark | 192/64 |
| 1225980 | 9/1966 | Fed. Rep. of Germany | |
| 3300710 | 7/1983 | Fed. Rep. of Germany | 192/64 |
| 3725835 | 2/1988 | Fed. Rep. of Germany | |
| 2940841C2 | 7/1989 | Fed. Rep. of Germany | |
| 415982 | 10/1910 | France | |
| 1224650 | 2/1960 | France | 192/64 |
| 249896 | 7/1926 | Italy | 192/64 |
| 338693 | 3/1936 | Italy | 192/64 |
| 498901 | 11/1954 | Italy | 192/64 |
| 818 | of 1901 | United Kingdom | 192/64 |
| 2167819 | 6/1986 | United Kingdom | |
| 2194007 | 2/1988 | United Kingdom | |

Primary Examiner—Rodney H. Bonck
Assistant Examiner—Andrea Pitts
Attorney, Agent, or Firm—Brumbaugh, Graves, Donohue & Raymond

[57] ABSTRACT

According to an illustratie example of the invention, a pawl-ratchet free-wheel mechanism has an inner rotor and an outer rotor. The outer rotor is provided with a pocket located in an inner circumferential face of the outer rotor. A pawl is pivotally mounted in the pocket. The pocket is formed by dislocation of material of the outer rotor member by a cold shaping method.

18 Claims, 3 Drawing Sheets

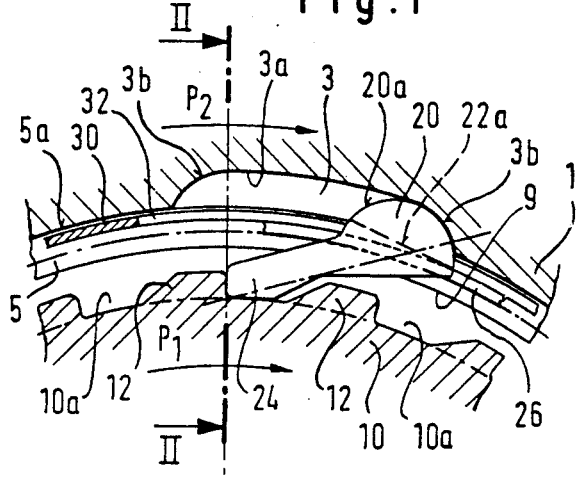
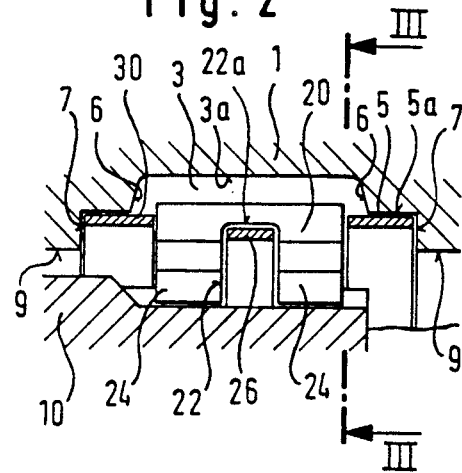
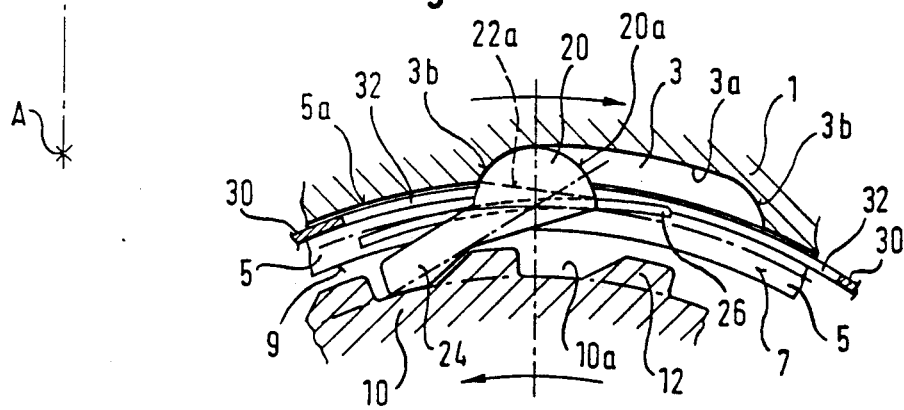
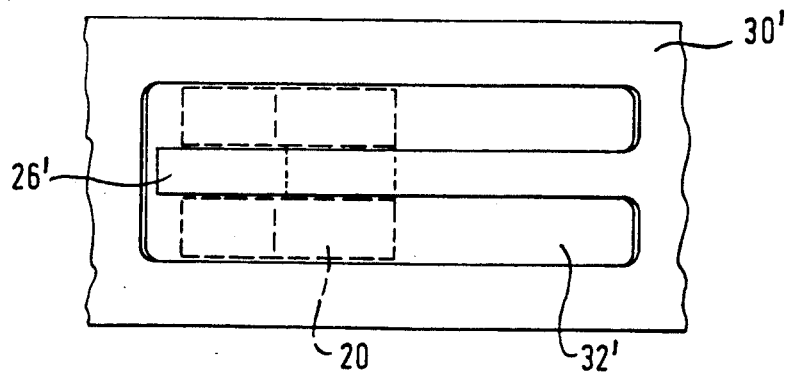

PAWL-RATCHET FREE-WHEEL MECHANISM FOR A BICYCLE HUB

BACKGROUND OF THE INVENTION

This invention relates to a pawl-ratchet free-wheel mechanism for a bicycle hub comprising two rotor members rotatable about a common axis, namely an inner rotor member having an outer circumferential surface and an outer rotor member having an inner circumferential surface radially opposite to said outer circumferential surface and at least one pawl member for transmitting a torque between said rotor members.

Such pawl-ratchet free-wheel mechanisms are used in bicycle hubs, e.g. for transmitting the driving torque from a component of a planetary gear to a hub sleeve. In this case, the purpose of the pawl-ratchet free-wheel mechanism is to permit a free rotation of the bicycle hub sleeve in forward direction, when the bicycle rotates faster than the driving component of the respective planetary gear and, on the other hand, to permit torque transmission from the planetary gear component to the hub sleeve.

The pawl-ratchet free-wheel mechanisms for bicycle hubs are produced in large series, and it is highly important to manufacture the components of such a mechanism at lowest possible costs. On the other hand, these components must be manufactured with a very high precision. In known pawl-ratchet free-wheel mechanisms, expensive manufacturing steps are necessary, particularly for providing the bearing surfaces of the pawls, which are commonly made by milling.

STATEMENT OF THE PRIOR ART

From German Patent 29 40 841 a pawl-ratchet free-wheel mechanism is known in which the pawls are rotatably mounted in pockets of an inner circumferential surface of an outer rotor member, and these pawls are engageable with ratchet teeth means provided on an outer circumferential surface of an inner rotor member. The formation of the pockets for the pawls in the outer rotor member has created considerable problems. These problems become still greater, if it is desired to locate the pawls at an intermediate position of the pawl carrying rotor member, in which case the milling of the pockets is very difficult or impossible.

OBJECT OF THE INVENTION

It is an object of the present invention to provide a pawl-ratchet free-wheel mechanism which can be manufactured at low costs and nevertheless with high precision. More particularly, it is an object of present invention to provide pawl bearing pockets in an inner circumferential surface of an outer rotor member at low costs and nevertheless with the high precision necessary for pivotally mounting the pawls. More particularly, it is an object to provide pawl bearing pockets at axially intermediate locations of an internal surface of a rotor member, which pockets are closed at both ends thereof. Further, it is an object of the present invention to provide a pawl carrying rotor member without milling operations in connection with the formation of pawl pockets.

SUMMARY OF THE INVENTION

For accomplishing at least one of the above objects, a pawl-ratchet free-wheel mechanism for a bicycle hub comprises two rotor members rotatable about a common axis, namely an inner rotor member having an outer circumferential surface and an outer rotor member having an inner circumferential surface radially opposite to said outer circumferential surface. At least one pawl member is provided for transmitting a torque between said rotor members. The outer circumferential surface is provided with ratchet teeth means. The inner circumferential surface is provided with at least one bearing pocket, said bearing pocket having a bearing surface, said bearing surface having circumferentially opposite end portions. The pawl member has a counter-bearing portion engageable with the bearing surface. The pawl member further has a teeth engagement portion engageable with said ratchet teeth means. Spring means are provided for biasing the teeth engagement portion of the pawl member towards engagement with the ratchet teeth means. At least said end portions of the bearing surface are non-cuttingly shaped by dislocation of a material of said outer rotor member.

The term "non-cuttingly shaped" is used for all shaping methods in which machining, such as milling and turning are avoided. More particularly, "non-cuttingly shaped" means cold shaped or cold impact shaped or even forged.

The outer rotor member is particularly a tubular member obtained by usual manufacturing methods, such as tute drawing, tube welding, forging or cold impact shaping.

According to a first embodiment, the pocket with substantially the total bearing face thereof is formed by a radially outward dislocation of material of said outer rotor member. In this case, the pocket may be formed by an inner tool having a form complementary to the pocket form and by an outer tool to be applied to an outer circumferential surface of the outer rotor member which outer tool has a shape similar to the pocket form, but having larger dimensions according to the wall thickness of the outer rotor member.

When shaping the pocket in the above described way, it is relatively easy to obtain a bearing face having the necessary precision for bearing the respective pawl. It is much more difficult to obtain the side faces of the respective pocket with a precision permitting the axial positioning of the respective pawl. In consideration of this, the pawl member may be positioned in at least one axial direction by positioning means, which positioning means may be independent of the non-cuttingly shaped side faces of the pocket.

More particularly, the internal circumferential surface may be provided with a circumferentially extending groove adjacent said pocket. This groove has a bottom surface intersecting with the bearing surface of the pocket and at least one side face. This at least one side face may form a part of the positioning means. The circumferential groove may be obtained by a turning operation which is by far less expensive than milling operations.

If the pocket is to be located at an intermediate location between the axial ends of the inner circumferential surface, the circumferential groove may have respective side faces axially outside both axial ends of the pockets. Such, both said side faces may form part of the positioning means so that the pawl can be positioned in both axial directions.

The positioning means may further comprise an annular positioning member accommodated by the groove and locked against movement in circumferential direction with respect to the outer rotor member. This annular positioning member may have at least one window in overlapping relationship with respect to the pocket. The pawl member may be located within the window and may be axially positioned by the axially spaced edges of the window. Such, the axial positioning is completely independent of the cold shaped side faces of the pocket and may provide a high positioning precision.

The spring means may comprise a spring member extending substantially circumferentially in the circumferential area of the pawl member. This spring member may act onto a radially inwards directed spring engagement face of the pawl member.

More particularly, the spring member may be a leaf spring member having a longer cross-sectional axis in the direction of the axis of the mechanism and a lower cross-sectional axis in radial direction.

For engagement with the spring member, the pawl member may have a slot axially between respective axial end faces of the pawl member. This slot has a bottom face, and this bottom face may be the spring engagement face.

The spring member may be a substantially circular spring member, which extends in circumferential direction, substantially along the total circumference of the inner circumferential surface. For providing a radially directed pretensioning force on the pawl member or two or more pawl members, the circular spring member may have open ends and an inner pretension biasing the spring member in radially outward direction.

If an annular positioning member is provided, the spring means may comprise a leaf spring integral with the annular positioning member and extending from one end of the window towards the other end of the window. This leaf spring may be integral with the annular positioning member adjacent said one end of said window.

According to a further embodiment of the invention, the pocket is formed by a circumferential groove of the internal circumferential face and by terminal projections projecting radially inwards into this groove. These projections may be obtained by radially inward dislocation of material of the outer rotor member. Such, the bearing surface is formed by a bottom surface of the groove and by the radially inwards directed projections. The radially inward dislocation of the material may be obtained by cold shaping. This cold shaping operation can be performed with a radially inner tool having a recess complementary to the shape of the desired projections and with a radially outer tool acting onto a radially outer surface of the outer rotor member. The circumferential groove may be again obtained by a turning operation.

In such an embodiment, the pawl member may be axially positioned by at least one side face of the groove and preferably by two side faces of the groove.

The end portions of the bearing surface which are provided by the projections, may join the bottom surface of the circumferential groove by smooth transition roundings.

The spring means may in this embodiment comprise a circular spring member about the axis. The spring member may act on a substantially radially inwards directed spring engagement face of the pawl member. The circular spring may have a circular cross-section.

The spring engagement face of the pawl member may again be a bottom face of a slot of the pawl member, which slot is located between respective axial end faces of the pawl member.

The ratchet teeth means may again be non-cuttingly shaped by dislocation of material of the inner rotor member. E. g., these ratchet teeth means may be shaped by cold impact shaping.

The outer rotor member should preferably be a tubular member having a relatively small wall thickness. E. g., the outer rotor member may be a hub sleeve of a bicycle hub.

The inner rotor member may be a component of a planetary gear of a bicycle hub, such as a planet carrier wheel or a ring wheel.

In accordance with the above discussed first embodiment of the mechanism, a first method of manufacturing the outer rotor member is proposed. A pocket is formed in an inner circumferential surface of the outer rotor member. The method comprises non-cuttingly shaping said pocket by radially outward dislocation of material of the outer rotor member.

In this first method, a circumferential groove may be turned into the inner circumferential surface of the outer rotor member in overlapping relationship with the at least one pocket.

A second method corresponding to the above discussed second embodiment of the mechanism comprises
a) turning a substantially circumferential groove into an inner circumferential surface of an outer rotor member and
b) radially inwards dislocating material of said outer rotor member into said circumferential groove.

This dislocated material forms radially inwards directed projections within the circumferential grooves. Two circumferentially subsequent projections form the circumferential ends of a respective pocket. In other words: these projections form the end portions of the respective bearing surface.

The mechanism of the present invention can be manufactured with small dimensions, particularly in radial direction. This is of particular importance with multi-speed bicycle hubs. The cold impact shaping is a preferred method for manufacturing the components of the mechanism, because cold shaping is known for bicycle hub components. Therefore, the respective machines are easily available for the bicycle hub manufacturer.

The various features of novelty which characterize the invention are pointed out with particularity in the claims annexed hereto and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereinafter with reference to embodiments shown in the accompanying drawings in which FIG. 1 shows a cross-section perpendicular to the axis of a free-wheel mechanism according to this invention;

FIG. 2 shows a section according to line II—II of FIG. 1;

FIG. 3 shows a cross-section according to line III—III of FIG. 2;

FIG. 4 shows a detail of an annular positioning member with a modified embodiment similar to the embodiment of FIG. 1;

DETAILED DESCRIPTION OF THE PREFERRED EMBODIMENTS

Figure 5:
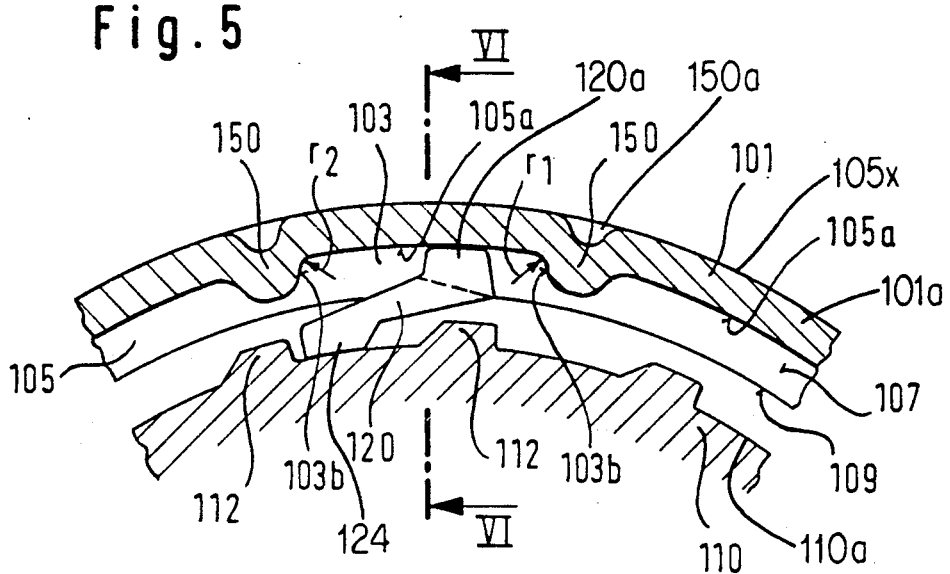
FIG. 5 shows a further embodiment of a mechanism of this invention according to a similar section as shown in FIG. 1.

In FIGS. 1 to 4 and 8, a first embodiment of the invention is shown.

According to FIG. 1, an inner rotor member 10 having an axis A is surrounded by an outer rotor member 1 having an external circumferential surface 1a and a wall portion 3x projecting radially outward therefrom. The inner rotor member 10 may be a component of a planetary gear in a bicycle hub, whereas the outer rotor member 1 may be a hub sleeve of a bicycle hub. At least one pawl member 20 is provided for transmitting a torque from the inner rotor member 10 to the outer rotor member 1. A torque may be transmitted in the direction of the arrows $P_1$ and $P_2$ The inner rotor member 10 is provided with ratchet teeth 12. These ratchet teeth 12 are shaped such that they may transmit a torque in the direction of arrows $P_1$ and $P_2$ from the inner rotor member 10 through at least one pawl member 20 to the outer rotor member 1. If the outer rotor member 1 rotates faster in the direction of the arrow $P_2$ than the inner rotor member rotates in the direction of arrow $P_1$, the pawl member 20 may slide over the teeth 12.

The pawl member 20 comprises a semi-circular counter-bearing portion 20a and a ratchet teeth engagement portion 24. The outer rotor member 1 is provided with an inner circumferential surface 9. This inner circumferential surface 9 is provided with at least one pocket 3. This pocket 3 defines a bearing surface 3a having end portions 3b. The end portions 3b have a radius of curvature substantially corresponding to the radius of curvature of the semi-circular counter-bearing portion 20a. Such, the pawl member 20 is rotatably mounted within the pocket 3 on the bearing face 3a,3b. The teeth engagement portion 24 of the pawl member 20 is provided with a slot 22. The bottom face of this slot 22 is designated by 22a. A circular leaf spring 26 is accommodated within the outer rotor member 1. This leaf spring member 26 is biased to expand in radially outer direction and acts onto the bottom face 22a of the slot 22. The spring member 26 exerts a torque on the bottom face 22a such that the teeth engagement portion 24 of the pawl member 20 is biased into engagement with the ratchet teeth 12. The pocket 3 has cold shaped side faces 6. A circular groove 5 is milled into the inner surface 9. This groove 5 has side faces 7 and a bottom face 5a. The groove 5 is turned into the inner surface 9 such that the side faces 7 are located on both sides of the side faces 6 of the pocket 3. The radial depth of the groove 5 is smaller than the radial depth of the pocket 3. The groove 5 intersects with the pocket 3. An annular positioning member 30 is located within the groove 5. This annular positioning member 30 is locked against rotation with respect to the outer rotor member 1. The circumferential edges of the annular positioning member 30 are engageable with the side faces 7 of the annular groove 5. The outer circumferential face of the annular positioning member 30 is applied against the bottom face 5a of the groove 5. The annular positioning member 30 is provided with a window 32 in overlapping relationship with the pocket 3. The pawl member 20 is axially located within the window 32 such that the pawl member 20 is substantially unmovable in axial direction along the axis A. Thus, the axial position of the pawl member 20 is defined by the precisely machined side faces 7 of the turned circular groove 5. The circumferential length of the pocket 3 and of the window 32 is such that the pawl member 20 can move with respect to the rotor member 1 in circumferential direction along the circumferential length of the pocket 3. The purpose of this circumferential play of the pawl 20 is to allow the reliable releasing of a back-pedaling brake after braking. This is well known in the art. If a back-pedaling brake is not provided in the respective bicycle hub, the shape of the pocket 3 may be exactly complementary to the shape of the bearing portion 20a such that the pawl member 20 is rotatably mounted on the outer rotor member 1 but is unmovable in circumferential direction with respect to the outer rotor member 1. The spring member 26 is a leaf spring made of sheet metal and having a rectangular cross-sectional area as shown in FIG. 2. The annular positioning member 30 has also a rectangular cross-sectional area and is also made of sheet metal.

The inner rotor member 10 has an outer circumferential face 10a in which the ratchet teeth 12 are shaped by a non-cutting shaping method and more particularly by cold impact shaping.

In the alternative embodiment as shown in FIG. 4, the spring member 26' is integrally formed with the annular positioning member 30' within the window 32'. Such, the number of parts is reduced.

Figure 8:
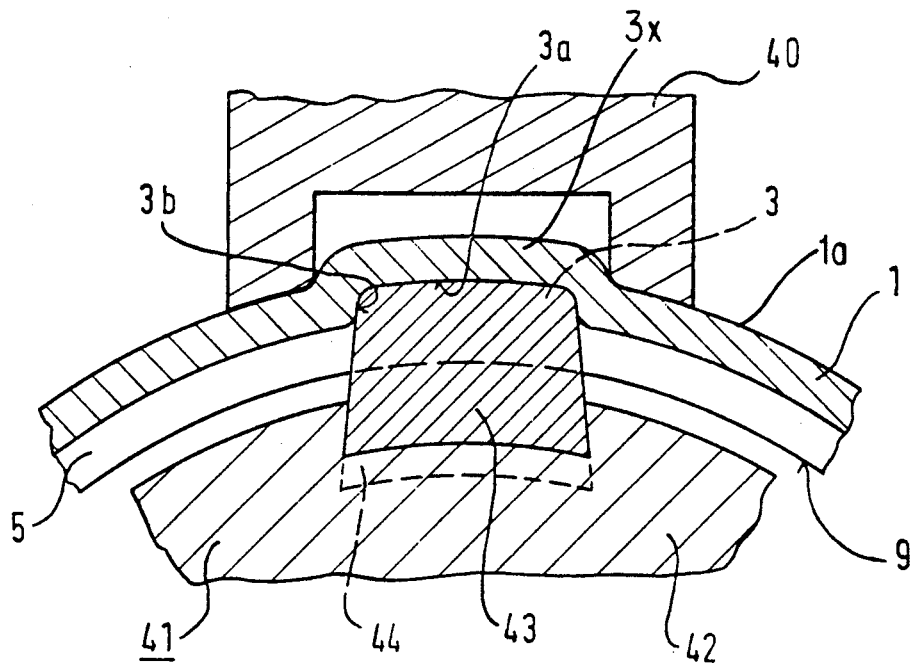
FIG. 8 shows the method of operation in shaping a pocket in an outer rotor member as shown in FIG. 1

The method of manufacturing the outer rotor member 1 is shown in FIG. 8. An outer tool 40 is applied to the outer surface of the outer rotor member 1 at the location of the pocket 3 to be formed. An inner tool unit 41 comprises a tool carrier 42 and an inner tool 43. The inner tool 43 is guided on the tool carrier 42 by a wedge shaped guide 44. Such by axial relative motion of the tool carrier 42 and the inner tool 43, the inner tool 43 may be moved in radially outward direction towards the outer tool 40 such shaping the pocket 3.

The tool unit may comprise two or more inner tools 43 for shaping two or more pockets 3. If a plurality of pockets is desired, these may also be coined one after the other.

It is quite clear that during the operation according to FIG. 8, the bearing face 3a,3b may be shaped in a very precise form, whereas the flanks 6 (see FIG. 2) are shaped with less precision. The groove 5 is turned into the inner face 9 of the outer rotor member 1, before or preferably after the pocket 3 has been shaped.

Figure 6:
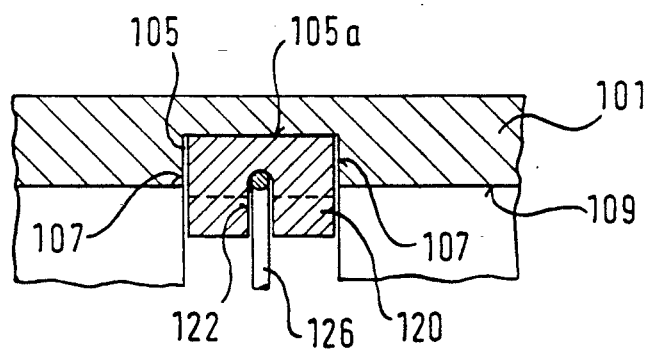
FIG. 6 shows a section according to line VI—VI of FIG. 5.
Figure 7:
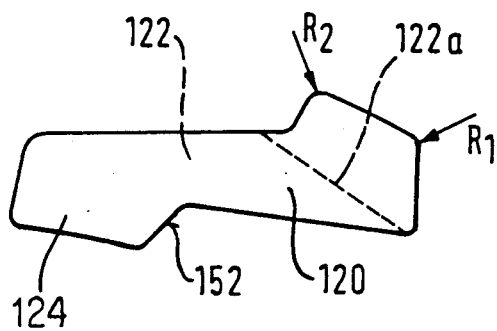
FIG. 7 shows a pawl member of a mechanism according to FIG. 5.

A further embodiment of the mechanism of this invention is shown in FIGS. 5, 6 and 7. Analogous parts are designated by the same reference numbers as in FIGS. 1 to 4 increased by 100.

The outer rotor member 101 is provided at its radially inner circumferential face 109 with a circumferential groove 105 which is confined by a circumferential wall 101a. The circumferential groove 105 has a bottom surface 105a and side faces 107. The groove 105 is the result of a turning operation. The pocket 103 is obtained by forming radially inward directed projections 150 within the groove 105 and indentations 150a provided on a radially outward directed circumferential surface 105x. The projections 105 form the end portions 103b of the bearing face, whereas the bottom surface 105a of the groove 105 forms the middle portion of the bearing face. The pocket 103 accommodates the pawl member 120. The pawl member 120 has a slot 122 with a bottom face 122a. A circular spring member 126 having a circular cross-section is accommodated within the slot 122 and engages the bottom face 122a, so as to bias the pawl member 120 into torque transmitting engagement with the ratchet teeth 112 of the inner rotor member 110. The radius $r_2$ and the radius $r_1$ form the bearing positions of the pawl member 120. The radius $R_2$ of the pawl member cooperates with the radius $r_2$, and the radius $R_1$ of the pawl member cooperates with the radius $r_1$ of the pocket 103. It is to be noted that the radius $R_2$ is smaller than the radius $r_2$ and that the radius $R_1$ is smaller than the radius $r_1$. The pocket 103 has again an elongated shape in view of the combination of the mechanism with a back-pedaling brakesystem. A face 152 of the pawl member 120 is shaped such as to slide across the ratchet teeth 112, when the outer rotor member 101 rotates in clockwise direction faster than the inner rotor member 110. The inner rotor member 110 can transmit a torque to the outer rotor member 101, when the pawl member 120 is in engagement with a tooth 112 and the radius $R_1$ is in engagement with the radius $r_1$.

Figure 9:
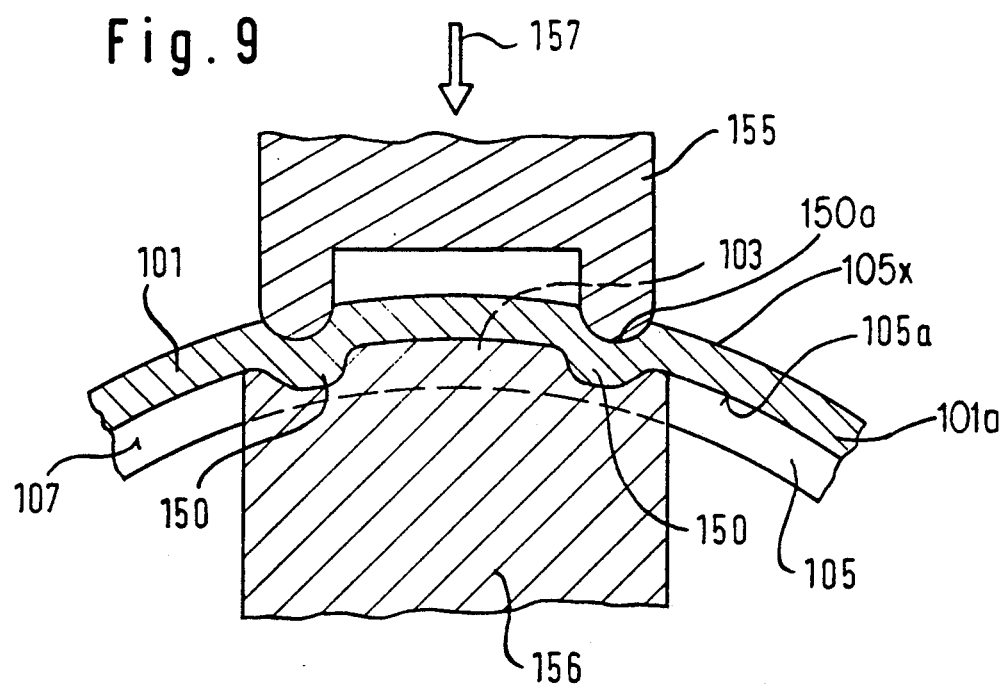
FIG. 9 shows a method of operation in shaping a pocket in an outer rotor member as shown in FIG. 5.

In FIG. 9, there is shown a method of manufacturing the pocket 103 in a first step. The groove 105 with the bottom face 105a and the side faces 107 is turned into the outer rotor member 101. Hereupon, the projections 150 within the circular groove 105 are provided by an outer tool 155 and an inner tool 156. The outer tool 155 is approached in the direction of arrow 157 against the outer surface of the rotor member 101, and the inner tool 156 is held against the bottom surface 105a, so as to define the projection shape of the dislocated material. The tools 155 and 156 may be components of double or multi-tool units adapted for simultaneously forming two or more pockets 103. The radially outward movement of the inner tool 156 into the groove 105 may again be obtained by wedge cooperation with a tool carrier (not shown).

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

I claim:

1. A pawl-ratchet free-wheel mechanism for a bicycle hub, comprising:

two rotor members (10,1) rotatable about a common axis (A), namely an inner rotor member (10) having an outer circumferential surface (10a), and an outer rotor member (1) having an inner circumferential surface (9) radially opposite to said outer circumferential surface (10a).

at least one pawl member (20) for transmitting a torque between said rotor members (10,1), said outer circumferential surface (10a) being provided with ratchet teeth means (12), said inner circumferential surface (9) being provided with at least one bearing pocket (3), said bearing pocket (3) having a bearing face (3a, 3b), said bearing face (3a, 3b) having circumferentially opposite end portions (3b), said pawl member (20) having a counter-bearing portion (20a) engageable with said bearing face (3a, 3b), said pawl member (20) further having a teeth engagement portion (24) engageable with said ratchet teeth means (12), spring means (26) for biasing said teeth engagement portion (24) of said pawl member (20) towards engagement with said ratchet teeth means (12), said pawl member (20) being positioned in at least one axial direction by positioning means (30,7), said inner circumferential surface (9) being provided with a circumferentially extending groove (5) adjacent said pocket (3), said groove (5) having a bottom surface (5a) which intersects with said pocket (3) and two side faces (7) which form a part of said positioning means (30,7), said positioning means (30,7) further comprising an annular positioning member (30) accommodated by said groove (5) and locked against movement in circumferential direction with respect to said outer rotor member (1), said annular positioning member (30) having at least one window (32) in overlapping relationship with respect to said pocket (3), said at least one pawl member (20) being located within said window (32) and being axially positioned by said window (32).

2. A mechanism as set forth in claim 1, said spring means (26) comprising a spring member (26) extending substantially circumferentially in the circumferential area of said pawl member (20), said spring member (26) acting onto a radially inwards directed spring engagement face (22a) of said pawl member (20).

3. A mechanism as set forth in claim 2, said pawl member (20) having a slot (22) axially between respective axial end faces of said pawl member (20), said slot (22) having a bottom face (22a), said bottom face (22a) being said spring engagement face.

4. A mechanism as set forth in claim 2, said spring member (26) being a substantially circular spring member.

5. A mechanism as set forth in claim 1, said spring means (26') comprising a leaf spring (26') integral with said annular positioning member (30') and extending from one end of said window (32') towards the other end of said window (32'), said leaf spring (26') being integral with said annular positioning member (30') adjacent said one end of said window (32').

6. A pawl-ratchet free-wheel mechanism for a bicycle hub comprising:

two rotor members (10,1) rotatable about a common axis (A), namely an inner rotor member (10) having an outer circumferential surface (10a) and an outer rotor member (1) having an inner circumferential surface (9) radially opposite to said outer circumferential surface (10a), at least one pawl member (20) for transmitting a torque between said rotor members (10,1), said outer circumferential surface (10a) being provided with ratchet teeth means (12), said inner circumferential surface (9) being provided with an least one bearing pocket (3), said bearing pocket (3) having a bearing face (3a, 3b), said bearing face (3a, 3b) having circumferentially opposite end portions (3b), said pawl member (20) having a counter-bearing portion (20a) engageable with said bearing face (3a,3b), said pawl member (20) further having a teeth engagement portion (24) engageable with said ratchet teeth means (12), spring means (26) for biasing said teeth engagement portion (24) of said pawl member (20) towards engagement with said ratchet teeth means (12), said outer rotor member (1) further having an external circumferential surface (1a), said bearing pocket (3) being confined in radially outward direction by a wall portion (3x) of said outer rotor member (1), said wall portion (3x) projecting radially outward of said external circumferential surface (1a).

7. A mechanism as set forth in claim 1 or 6, said pocket (3) being formed by radially outward dislocated material of said outer rotor member (1).

8. A pawl-ratchet free-wheel mechanism for a bicycle hub comprising:

two rotor members (110,101) rotatable about a common axis (A), namely an inner rotor member (110) having an outer circumferential surface and an outer rotor member (101) having an inner circumferential surface (109) radially opposite to said outer circumferential surface, at least one pawl member (120) for transmitting a torque between said rotor members (110,101), said outer circumferential surface (110,9) being provided with ratchet teeth means (112), said inner circumferential surface (109) being provided with an least one bearing pocket (103), said bearing pocket (103) having a bearing face (105a, 103b), said bearing face (105a, 103b) having circumferentially opposite end portions (103b), said pawl member (120) further having a counter-bearing portion (120a) engageable with said bearing face (105a,103b), said pawl member (120) further having a teeth engagement portion (124) engageable with said ratchet teeth means (112), spring means (126) for biasing said teeth engagement portion (124) of said pawl member (120) towards engagement with said ratchet teeth means (112), said pocket (103) being formed by a circumferential groove (105) of said inner circumferential face (109) and by terminal projections (150) projecting radially inward into said groove (105), said groove (105) being confined in radially outward direction by a circumferential wall (101a) of said outer rotor member (101), said wall (101a) having a radially inward directed circumferential bottom surface (105a) and a radially outward directed circumferential surface (105x), said circumferential bottom surface (105a) being provided with said projections (150), said radially outward directed surface (105x) being provided with indentations (150a) substantially radially aligned with said projections (150) and substantially complementary to said projections (150).

9. A mechanism as set forth in claim 8, said projections (150) being formed by radially inward dislocated material of said outer rotor member (101).

10. A mechanism as set forth in claim 8, said pawl member (120) being axially positioned by at least one side face (107) of said groove (105).

11. A mechanism as set forth in claim 8, said end portions (103b) of said bearing face (105a, 103b) joining said bottom surface (105a) of said circumferential groove (105) by smooth transition roundings ($r_1, r_2$).

12. A mechanism as set forth in claim 8, said circumferential groove (105) being turned into said inner circumferential surface (109).

13. A mechanism as set forth in claim 8, said spring means (126) comprising a circular spring member (126) about said axis, said spring member (126) acting on a substantially radially inwards directed spring engagement face (122a) of said pawl member (120).

14. A mechanism as set forth in claim 8, said spring engagement face (122a) of said pawl member (120) being a bottom face (122a) of a slot (122) of said pawl member (120) located between respective axial end faces of said pawl member (120).

15. A mechanism as set forth in claim 1, 6 or 8 said ratchet teeth means (12) being non-cuttingly shaped by dislocation of material of said inner rotor member (10).

16. A mechanism as set forth in claim 1, 6 or 8 said outer rotor member (1) being a hub sleeve of a bicycle hub.

17. A mechanism as set forth in claim 1, 6 or 8 said inner rotor member (10) being a component of a bicycle hub.

18. A mechanism as set forth in claim 1, 6 or 8, said pocket (3) being elongated in circumferential direction, such as to permit a circumferential play of said pawl member (20) with respect to said outer rotor member (1).

* * * * *

UNITED STATES PATENT AND TRADEMARK OFFICE
CERTIFICATE OF CORRECTION

PATENT NO. : 5,143,189

DATED : September 1, 1992

INVENTOR(S) : Gerhard Meier-Burkamp

It is certified that error appears in the above-identified patent and that said Letters Patent is hereby corrected as shown below:

Item [57] Abstract, line 1, "illustratie" should read
 --illustrative--;
 Col. 2, line 28, "tute" should read --tube--;
 Col. 8, line 63, "with an" should read --with at--;
 Col. 9, line 30, "an least" should read --at least--;
 Col. 10, line 34, "8" should read --8, --;
 Col. 10, line 37, "8" should read --8, --;
 Col. 10, line 40, "8" should read --8, --.

Signed and Sealed this

Sixteenth Day of November, 1993

Attest:

BRUCE LEHMAN

Attesting Officer

Commissioner of Patents and Trademarks